Feb. 9, 1965
C. A. GLASS
3,169,003
EJECTION SEAT APPARATUS
Filed June 18, 1963
2 Sheets-Sheet 1
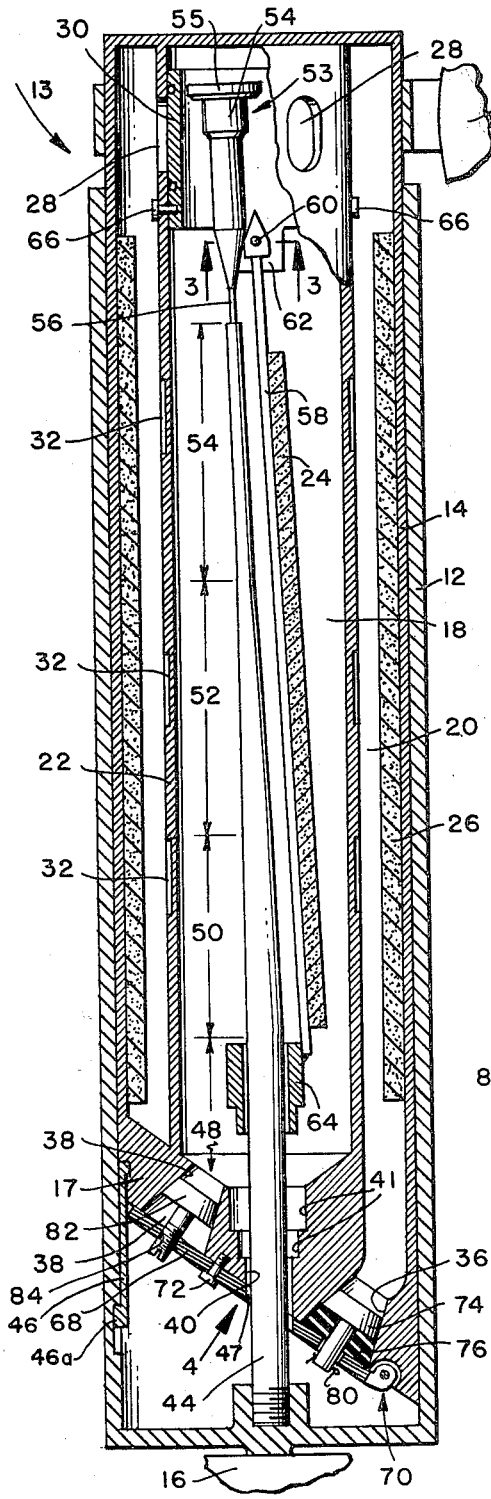
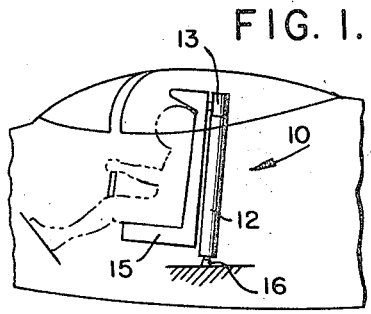
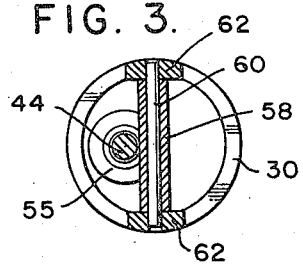
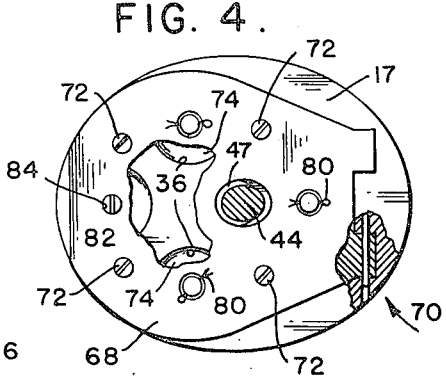
INVENTOR.
CECIL A. GLASS
BY
ATTORNEY Feb. 9, 1965 C. A. GLASS 3,169,003
EJECTION SEAT APPARATUS
Filed June 18, 1963 2 Sheets-Sheet 2
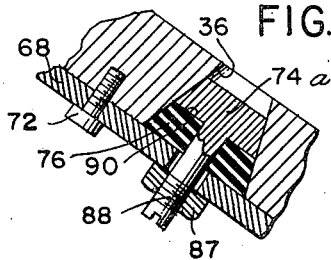
FIG. 7.
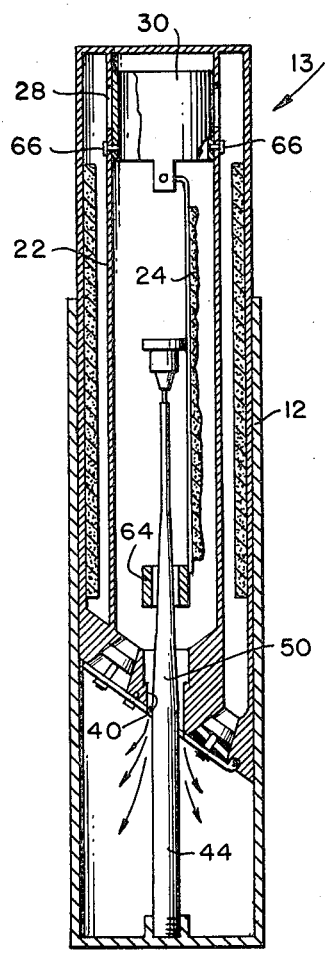
FIG. 5A.
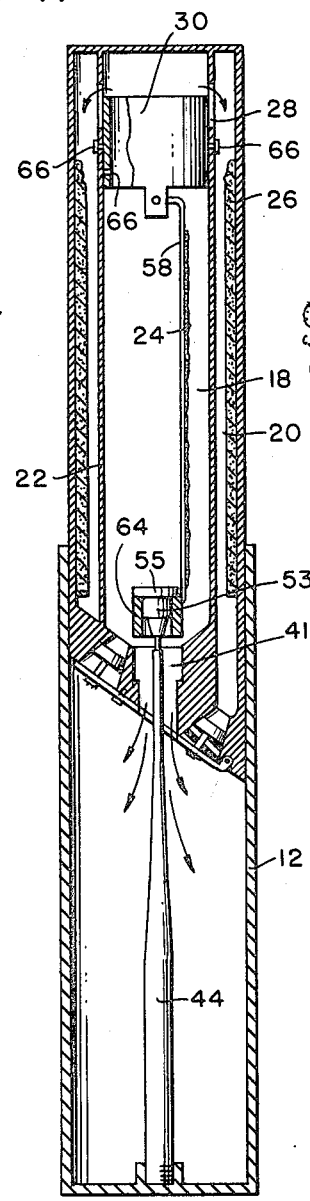
FIG. 5B.
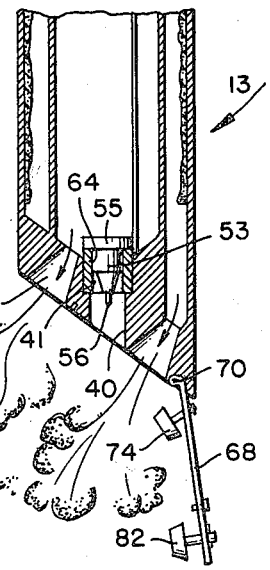
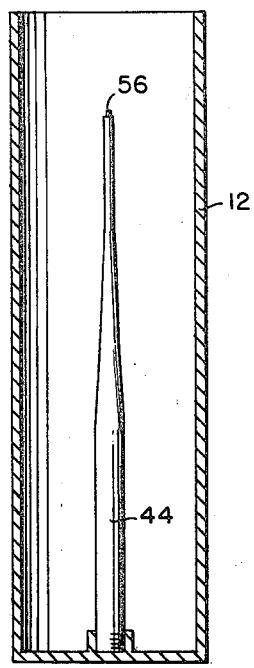
FIG. 5C.
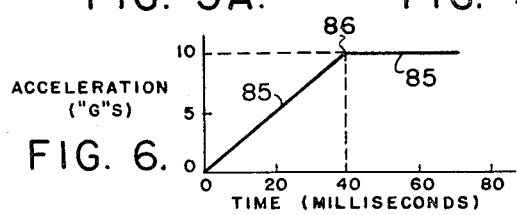
FIG. 6.
INVENTOR.
CECIL A. GLASS
BY
ATTORNEY.

United States Patent Office 3,169,003
Patented Feb. 9, 1965

3,169,003
EJECTION SEAT APPARATUS
Cecil A. Glass, China Lake, Calif., assignor to the United States of America as represented by the Secretary of the Navy
Filed June 18, 1963, Ser. No. 288,842
4 Claims. (Cl. 244—122)
(Granted under Title 35, U.S. Code (1952), sec. 266)

The invention described herein may be manufactured and used by or for the Government of the United States of America for governmental purposes without the payment of any royalties thereon or therefor.

This invention relates to a rocket propelled pilot ejection seat of the type which is initially ejected from a catapult tube by pressurized gas, and more particularly to improved catapult apparatus for having "hard" or high initial acceleration starts.

For purposes of this specification "rate of increase of instantaneous acceleration" is defined as the second derivative of the velocity at which a pilot is impelled during catapult action in apparatus of the type referred to. It has the dimensions of ft./sec./sec./sec., or in units of standard gravitational acceleration, G's/sec. "Upper limit of acceleration" is the maximum value of the simple acceleration, or first derivative of velocity at which the pilot is impelled. It has the dimensions of ft./sec./sec., or G's.

In an ejection seat system of the type described in U.S. Patents Nos. 2,954,947 and 3,035,796, catapult tube apparatus is combined with rocket propulsion apparatus to provide a capability to impel the pilot from ground level to sufficient height for a safe parachute landing. In these instances the initial acceleration characteristics achieved during the catapult action have a critical influence upon the capability of the ejection seat to provide safe ejections in certain circumstances, such as ejections during high speed takeoffs or landings, or near ground level ejection while an aircraft is dropping. The more closely the initial accelerations in the catapult stage approaches the limits of human tolerance, the more the available rocket propulsion power may be used to impel the pilot to higher and safer heights. The problem is made more difficult because there are distinct limitations upon both the rate of increase of instantaneous acceleration which a human body may tolerate, and upon the upper limit of acceleration which it may tolerate.

Accordingly, the objectives of the present invention include provision of:

(1) Catapult apparatus for use with an aircraft ejection seat, which is capable of providing an accurately predeterminable rate of increase of instantaneous acceleration and an accurately predeterminable upper limit of acceleration.

(2) Catapult apparatus in accordance with the previous objective which is reliable and simple in operation.

(3) Two stage, catapult and rocket propulsion, ejection seat apparatus which provides more ejection power than heretofore available in the apparatus of the same size.

Other objects and many of the attendant advantages of this invention will be readily appreciated as the same becomes better understood by reference to the following detailed description when considered in connection with the accompanying drawings wherein:

FIG. 1 illustrates an aircraft ejection seat in relation to the cockpit of an aircraft;

FIG. 2 is an enlarged longitudinal section of FIG. 1 as viewed from the opposite side shown;

FIG. 3 is a section taken along line 3—3, FIG. 2;

FIG. 4 is an elevation in the direction of arrow 4, FIG. 1, portions being broken away;

FIGS. 5A through 5C are sections like FIG. 2, which illustrate sequential positions of various parts during operation of the catapult, certain parts being shown diagrammatically;

FIG. 6 is an idealized graph of variation of acceleration with time during operation of the device of FIG. 1; and FIG. 7 is a detail of an alternative form of construction of the device of FIG. 1.

Referring now to the drawing and in particular to FIGS. 1 and 2, ejection seat apparatus 10 comprises a catapult tube 12 which is closed at one end. A cylindrical motor unit 13 includes a casing 14 which is telescopically and slidingly disposed in catapult tube 12, with the top end of tubular casing 14 fastened to the pilot seat 15 and the lower end of catapult tube 12 affixed to the frame 16 of the aircraft. Attached to the casing 14 at its lower end is a canted nozzle plate 17. Apparatus 10 effects ejection of seat 15 in two stages of operation consisting of a first catapult action stage in which motor unit 13 is impelled along catapult tube 12 in a piston-like manner by the force of gases in the tube, and a second rocket propulsion action stage in which unit 13 separates from the catapult tube and is propelled as a free flight rocket by the discharge of propulsion gases through the nozzles in plate 17. In the catapult stage of operation, unit 13 serves as a gas generator for introducing the ejection gases into the catapult tube and also as the piston member against which the ejection gases exert their force.

The interior of the tubular housing is separated into an inner central chamber 18 and an outer annular chamber 20 by a tubular partition wall 22. Chamber 18, which contains a solid propellant, forms a combustion chamber for the generation of gases during the catapult stage. Outer chamber 20 contains a hollow propellant grain 26 bonded to the inner wall of casing 14, which is ignitable to produce propulsion gases for the rocket propulsion stage. A plurality of angularly spaced ports 28 are formed in partition wall 22 near its top end and these ports are initially closed by a tubular valve member 30 having its outer surface in sliding engagement with the inner surface of partition wall 22. A series of weakened zones 32 are formed along the length of tubular wall 22 which are designed to rupture under the pressure and temperature conditions produced by burning of propellant 26 to form additional port area between chambers 18 and 20 during the rocket propulsion stage of ejection. In operation, tubular valve member 30 opens at the time unit 13 is ejected from catapult tube 12, and the hot gases from the inner chamber 18 pass through ports 28 and ignite propellant grain 26. After ports 28 and weakened zones 32 are opened, inner chamber 18 and outer chamber 20 provide a combined chamber for the combustion of propellant grain 26. Canted nozzle plate 17 is provided with a set of three nozzles 36, FIGS. 2 and 4, communicating with the outer chamber 20 and a single nozzle 38 communicating with inner chamber 18, and these nozzles are angularly disposed at a predetermined angle to the axis of housing 14. This angle is chosen to provide a forward component of thrust to overcome tendencies to tumble, to counteract deceleration by the wind blast, and to aid in clearing the tail structure of the aircraft. The apparatus thus far described is essentially the same as disclosed in the previously mentioned U.S. patents.

Formed in nozzle plate 17 is a metering rod bore 40 of predetermined diameter. An enlarged bore portion 41 is provided at the entrance of bore 40 into chamber 18 to receive sleeve member 64. A metering rod 44 is affixed at its lower end to the bottom of catapult tube 12 and extends through orifice 40 into inner chamber 18 substantially throughout its entire length. Metering rod 44 varies in cross sectional area along its length and co-operates with bore 40 to form an annular gas flow metering passage 47. In operation, metering rod bore 40 travels up along metering rod 44 as motor unit 13 travels up the catapult tube 12, with the result that the passageway area of passage 47 will vary in accordance with the variation of cross sectional area of rod 44. Rod 44 has four sections having predetermined lengths and positions along the rod, consisting of a first uniform diameter section 48, a first tapered section 50 of decreasing area in the direction of length of the rod and having a predetermined taper, a second tapered section 52, likewise of decreasing area, and having a predetermined taper somewhat less than that of section 50, and a second uniform area section 54 of still further reduced diameter. The end of rod 44 is provided with a member 53 having a cylindrical surface 54 and a cap 55. Member 53 serves as a stop to actuate valve member 30 and as a plug to close metering rod bore 40, as will be subsequently described. A narrow rupture zone 56 is formed between section 54 and member 53, which is predetermined to rupture at the time of separation of the motor unit 13 from the catapult tube 12.

Disposed in inner chamber 18 is a connector rod 58 which is pivotally supported at its upper end by a wrist pin 60, best shown in FIG. 3, extending through a bearing rigidly formed on the end of the connecting arm and through a bearing in each of a pair of diametrically opposed tab portions 62 formed on the valve member 30. The lower end of connector rod 58 carries a sleeve 64 disposed about rod 44 adapted to engage cap 55 and to telescopically receive cylindrical surface 54. Connector rod 58 is formed from a flat strip of metal and further serves as a support for propellant 24. The top end of connector rod 58 is formed as an upwardly directed wedge to prevent possible damage to member 53 during relative movement. In its assembled position, connector rod 58 is bent slightly from an exact vertical position in order to connect with wrist pin 60. One or more shear screws 66 extend through wall 22 into valve member 30 locking member 30 against movement relative to wall 22. This in turn locks connector rod 58 and sleeve 64 with respect to inner wall 22.

A plate 68, best shown in FIG. 4, is pivotally attached to nozzle plate 17 by a hinge 70 disposed at the side which permits the plate 68 to swing rearward and out of the direction of blast from the canted nozzles. One or more shear screws 72 fasten plate 68 to nozzle plate 17 in an overlaying relationship to the rearmost face of nozzle plate 17, and plate 68 is provided with an opening through which metering rod 44 extends. Disposed in each nozzle 36 is a blow out nozzle plug 74 having a stem extending through a hole in plate 68. A gas seal 76, FIG. 2, of rubber or other suitable material is disposed between the body of the nozzle plug and the inner face of plate 68, with the plug retained in gas sealing engagement with the nozzle by the fastening of plate 68 to nozzle plate 17 by screws 72. Each plug 74 is locked to plate 68 by a cotter pin 80 to prevent the plug from becoming detached when expelled from the nozzle in order to obviate possibility of harm to other pilots who may be ejecting from the same aircraft. Disposed in nozzle 38 is a blow-out plug 82 having a threaded stem which engages threaded bore 84 in plate 68. Plug 82 is screwed into gas sealing engagement with the nozzle by rotation of the stem, which is facilitated by a slot milled in the end of the stem to receive a screw driver.

The operation of ejection seat 10 will now be described, it being understood that the complete sequence depicted takes place in an extremely short period of time, which may be in the order of 150 milliseconds. Propellant 24 is ignited in any suitable manner and the pressurized gases produced in chamber 18 flow into the bottom of catapult tube 12 through the annular passage 47. The force of these gases acts against the bottom end of motor unit 13 and moves it up tube 12. Also, since the pressure area provided by the rear face of plate 68 far exceeds the pressure area of the interior face of nozzle plug 82, the gas pressure in the tube will be effective to maintain nozzle plug 82 in gas tight engagement with the nozzle, so that the gases in chamber 18 may escape only through metering orifice 47. Referring now to FIG. 5A, when motor unit 13 has moved up catapult tube 12 to a position where metering rod bore 40 is opposite first tapered section 50 of metering rod 44, the passageway area of metering passage 47 progressively enlarges under travel of motor unit 13, metering increasing flow of gases into tube 12. Since connector rod 58 and sleeve 64 are connected to tubular valve member 30, and since the latter is locked to tubular wall 22 by shear screws 66, the sleeve rides up metering rod 42 with the movement of motor unit 13. When motor unit 13 reaches a predetermined position at which it has almost left tube 12, FIG. 5B, sleeve 64 engages cap 55 and screws 66 are sheared. Further movement of motor unit 13 causes relative movement between valve member 30 and wall 22, uncovering ports 28. The hot gases from chamber 18 flow into chamber 20 through ports 28 and initiate burning of propellant 26. If desired, an auxiliary igniter charge (not shown), of a suitable material, such as boron potassium nitrate, may be placed in chamber 20 in the form of a ring of such material opposite ports 28, in order to insure more rapid and reliable ignition of propellant 26. It will be apparent that sleeve 64 carried by connector rod 58 has cooperated with the cap 55 on rod 44 to provide a lost motion linkage to open ports 28 upon predetermined travel of motor unit 13 up the tube. Under further travel of the motor unit 13, FIG. 5C, the sleeve 64 is received in the enlarged bore 41 and further travel of motor unit 13 ruptures rod 44 at its rupture zone 56. Member 53 and sleeve 64 remain in telescoped relationship one to the other and to enlarged bore 41, and together form a plug which closes metering bore 40. When propellant 26 ignites, the pressure in chamber 20 rises rapidly. This occurs as motor unit 13 leaves catapult 12. The rapid rise of pressure in chamber 20 acts upon the interior faces of plugs 74 and 82 causing screws 72 to fail, and plate 68 swings rearwardly and to the side about hinge 70, permitting the gases to flow through all nozzles.

The variable area passage 47 between metering rod 44 and metering bore 40 is an important feature of the invention in that it provides a structure for the precise control of the instantaneous pilot seat acceleration during travel of motor unit 13 through catapult tube 12. This is illustrated by curve 85 of FIG. 6, which is an idealized graphical representation of the desired variation of instantaneous acceleration with time. The slope of curve to point 86 represents the desired initial rate of increase of acceleration of rocket motor unit 13 upon commencement of the movement along tube 12. For example, the magnitude of the rate of increase shown may be calculated from the graph by dividing the instantaneous acceleration at point 86 (10 G's) by the time interval from the start of the movement (.040 second), and the resultant quotient (250 G's/sec.) is such magnitude. Control of the pressurization of catapult tube 12 to provide such predetermined rate of increase of instantaneous acceleration is achieved by selecting the taper of first tapered section 50 of metering rod 44 to cooperate with metering bore 40 to selectively vary the flow rate of gases into tube 12 as necessary to produce the desired changing acceleration. The level portion of line 85, following point 86 represents the desired sustained constant acceleration provided by the catapult action, which corresponds to the upper limit of acceleration of the pilot during ejection, the magnitude shown being 10 G's. Control of the pressurization of the catapult tube to provide such sustained constant acceleration is achieved by selecting the taper of second tapered section 52 to cooperate with metering bore 40 to selectively vary the flow rate of gases as necessary to maintain the desired constant acceleration. It is to be noted that curve 85 is shown as substantially linear from the commencement of any acceleration. As a practical matter such linearity from the very commencement of all movement is achieved by means of a detent mechanism like the tyne type locking ring 46 (FIGS. 2 and 5 therein) disclosed in the aforementioned U.S. Patent 2,954,947, and illustrated in simplified form by an analogous resilient member 46 (FIG. 2 herein) having a trailing edge portion 46a engaging a shoulder in catapult tube 12, which does not release motor unit 13 until predetermined pressurization of the catapult tube occurs. Exhaustive tests of ejection seat apparatus 10, in which the actual performance of the rocket seat has been instrumented, have shown that the rocket seat follows these scheduled desired kinematic results with close tolerances and with a uniformity reproducible in units manufactured by standard manufacturing methods.

FIG. 7 shows a preferred construction for mounting each of the plugs 74a disposed in each of the outer chamber nozzles 36. Plug 74a is first brought into gas tight engagement against the nozzle wall by fastening plate 68 to nozzle plate 17 by means of screws 72, the gas seals 76 being somewhat compressed at this point. A nut 87 is then threaded upon a threaded valve stem 88, and turned into engagement with plate 86 with a predetermined torque. With this arrangement, even if gas seals 76 become burnt or ineffective during the catapult action, the gas force in the catapult tube, acting on the rear face 90 of each plug 74a, will be transmitted to plate 68 by the pull of nut 88, maintaining plug 82 (FIG. 1), which is rigidly carried by plate 86, in gas tight engagement with its nozzle port 38. In similar manner to that described in connection with FIG. 1, the pressure area provided by the three plugs 74 in the outer chamber nozzles 36 exceed the pressure area of the inner face of plug 82 in the inner chamber nozzle 38, with the result that the force of the pressure of the gases in the catapult tube is effective to hold plug 82 in sealing engagement with inner chamber nozzle 38 against the internal pressure in inner chamber 18.

Obviously many modifications and variations of the present invention are possible in the light of the above teachings. It is therefore to be understood that within the scope of the appended claims the invention may be practiced otherwise than as specifically described.

What is claimed is:
1. In an ejection seat device of the type having a catapult tube having an open end and a closed bottom end, a cylindrical piston and motor unit to which an ejection seat is attached, said piston and motor unit having one of its ends telescopically extending into said catapult tube, the interior of said cylindrical unit forming a gas generator combustion chamber containing a propellant which burns to produce working gases to pressurize the catapult tube to impel the piston and motor unit and the ejection seat along the catapult tube, pressure responsive detent means locking the piston and motor unit in an initial position adjacent the bottom of the catapult tube and releasing same for travel along the catapult tube upon the gases in the catapult tube reaching a predetermined pressure, the improvements, in combination, comprising;
   (a) said piston and motor unit having a closure wall at its end adjacent the bottom of the catapult tube, said closure wall having a first aperture communicating the gas generator combustion chamber and the interior of the catapult tube, said first aperture being circular and of predetermined cross sectional area,
   (b) a metering rod having one of its ends affixed to the bottom of the catapult tube and extending through said first aperture and into the gas generator chamber,
   (c) said first circular aperture and said metering rod cooperating to form a variably restricted metering orifice through which the working gases are delivered from the gas generator combustion chamber to the catapult tube, the orifice area of said variably restricted metering orifice being equal to the difference between the cross sectional area of said first circular aperture and the cross sectional area of the linear portion of the metering rod disposed in the first aperture, said piston and motor unit at the moment it is released by the detent means being impelled by said predetermined pressure of gas in the catapult tube, said metering rod being of varied circular cross sectional areas along its length that vary in accordance with a predetermined relationship to the distance from the bottom of the catapult tube, said predetermined relationship being chosen to provide predetermined variations in the rate at which the working gases in the catapult tube are augmented under travel of the piston and motor unit along the catapult tube to impell the ejection seat away from its initial position with a desired time gradient of instantaneous acceleration.

2. Apparatus in accordance with claim 1, said metering rod comprising;
   (d) first and second sections sequentially disposed therealong in the direction away from the closed end of the catapult tube,
      said first section having a gradual taper in said direction selected to limit the motion of the seat to a predetermined rate of instantaneous maximum acceleration,
      said second section having a more gradual taper in said direction to limit the motion to a predetermined upper limit of acceleration.

3. Apparatus in accordance with claim 1, said ejector seat device further being of the type in which a concentric tubular wall separates said cylindrical piston and motor unit into an inner gas generator combustion chamber and an outer annular rocket propulsion combustion chamber containing a rocket propellant, normally closed valve means communicating said inner and outer chamber, and said metering rod carrying an abutment, means carried by said piston and motor unit and engageable with said abutment to actuate said valve to its open position upon said piston and motor unit travelling a predetermined distance up said catapult tube to thereby communicate the gases of the inner chamber to the outer chamber to ignite the propellant therein, said abutment and said engageable means adapted to shear from their supporting structures and to plug said first circular aperture after the piston and motor unit leaves the catapult tube.

4. In an ejection seat device;
   (a) a catapult tube having open and closed ends,
   (b) a tubular motor unit adapted to form a gas generator chamber for pressurizing the catapult tube, and having an ejection seat affixed to same,
   (c) said tubular motor unit having one of its ends extending into said catapult tube in telescoping relationship and having at said end,
   (d) a closure wall having a bore formed therein communicating between opposite sides thereof,
   (e) a metering rod having one of its ends affixed to the closed end of the catapult tube and extending through said bore and into said gas generator chamber,
   (f) said metering rod being of varying cross sections along its length and cooperating with said bore to form an annular gas metering passage therebetween that varies in passage area under travel of the tubular motor unit along the catapult tube to thereby vary the rate of flow of said gas from the gas generator chamber into the catapult tube, (g) said ejection seat device being of the type ejected in two stages comprising a first catapult action stage and a second rocket propulsion stage, (h) and in which said tubular motor unit is further adapted to form a source of rocket propellant gases during said second stage and the closure wall further has a rocket nozzle for discharging gas into ambient air, and (i) means closing said nozzle adapted to open when the motor tube separates from the catapult tube, (j) said metering rod carrying a first separable plugging means engageable in said bore to close same when the motor tube leaves the catapult, whereby the pressurized gases issue from the gas chamber through the bore during the first stage and through the rocket nozzle in the second stage, (k) said means closing said nozzle including a nozzle closure plug adapted to open when the motor tube separates from the catapult tube, (l) said means closing said nozzle comprising, a plate adjacent the exterior face of said closure wall, said plate adapted to maintain said nozzle closure plug in gas sealing engagement in the nozzle against the pressure within the inner chamber in response to force exerted by gases in said catapult tube.

References Cited by the Examiner

UNITED STATES PATENTS

| | | | |
|---|---|---|---|
| 2,724,237 | 11/55 | Hickman | 60—35.6 |
| 2,954,947 | 10/60 | Zabelka et al. | 244—122 |
| 3,035,796 | 5/62 | Glass | 60—35.6 |
| 3,039,964 | 6/63 | Hausmann | 60—35.6 |

FERGUS S. MIDDLETON, *Primary Examiner.*